(12) United States Patent
Voller et al.

(10) Patent No.: US 11,170,946 B2
(45) Date of Patent: *Nov. 9, 2021

(54) HIGH VOLTAGE SUPERCAPACITOR

(71) Applicant: Oxcion Limited, Wellington (GB)

(72) Inventors: Stephen David Voller, Hampshire (GB); Timothy Walder, Winchester (GB); Marappa Rajendran, Warwickshire (GB); Jonathan Tuck, Wiltshire (GB)

(73) Assignee: Oxcion Limited, Wellington (GB)

( * ) Notice: Subject to any disclaimer, the term of this patent is extended or adjusted under 35 U.S.C. 154(b) by 226 days.

This patent is subject to a terminal disclaimer.

(21) Appl. No.: 16/407,178

(22) Filed: May 8, 2019

(65) Prior Publication Data

US 2019/0272961 A1 Sep. 5, 2019

Related U.S. Application Data

(63) Continuation of application No. 15/454,063, filed on Mar. 9, 2017, now abandoned.

(30) Foreign Application Priority Data

Mar. 10, 2016 (GB) .................................... 1604133
Jul. 21, 2016 (GB) .................................... 1612687

(51) Int. Cl.
*H01G 11/58* (2013.01)
*H01G 11/14* (2013.01)
(Continued)

(52) U.S. Cl.
CPC ............. *H01G 11/58* (2013.01); *H01G 11/08* (2013.01); *H01G 11/14* (2013.01); *H01G 11/32* (2013.01);
(Continued)

(58) Field of Classification Search
CPC ........ H01G 11/56; H01G 11/62; H01G 11/64; H01G 11/18
See application file for complete search history.

(56) References Cited

U.S. PATENT DOCUMENTS 5,172,307 A * 12/1992 Tabuchi .................. H01M 4/00
361/502
6,469,888 B1 10/2002 Otsuki et al.
(Continued)

FOREIGN PATENT DOCUMENTS

CN 104332325 A 2/2015
JP 2007234745 A 9/2007
(Continued)

OTHER PUBLICATIONS

Ruiz et al., Ionic liquid-solvent mixtures as supercapacitor electrolytes for extreme temperature operation, RSC Advances, 2012, 2 pp. 5591-5598 (Year: 2012).*

*Primary Examiner* — Eric W Thomas
(74) *Attorney, Agent, or Firm* — Hodgson Russ LLP (57) ABSTRACT

The present invention provides a supercapacitor assembly which is characterised by comprising: a supercapacitor comprised of carbon-containing anode(s) and cathode(s), intermediate porous membrane(s) and an ionic liquid electrolyte; an electrical heater for heating the supercapacitor; and a thermostat for controlling the heater and maintaining the temperature of the ionic liquid at a temperature such that its viscosity is in the range 1 to 50 centipoise. In particular, there are provided supercapacitors which can operate at voltages greater than 3.5 v (for example, in the range 3.5 to 6 v) without significant long term redox degradation.

16 Claims, 3 Drawing Sheets

(51) Int. Cl.
  *H01G 11/62* (2013.01)
  *H01G 11/08* (2013.01)
  *H01G 11/32* (2013.01)
  *H01G 11/18* (2013.01)
  *H01G 11/36* (2013.01)

(52) U.S. Cl.
  CPC ............ *H01G 11/62* (2013.01); *H01G 11/18* (2013.01); *H01G 11/36* (2013.01); *Y02E 60/13* (2013.01)

(56) References Cited

U.S. PATENT DOCUMENTS

| | | |
|---|---|---|
| 8,081,418 B2 | 12/2011 | Brandon et al. |
| 2008/0192407 A1 | 8/2008 | Lu et al. |
| 2008/0304207 A1 | 12/2008 | Brandon et al. |
| 2009/0053597 A1 | 2/2009 | Tsunashima et al. |
| 2010/0304225 A1 | 12/2010 | Pascaly et al. |
| 2011/0318647 A1 | 12/2011 | Lee et al. |
| 2012/0231346 A1 | 9/2012 | Tsujii et al. |
| 2012/0262127 A1 | 10/2012 | Feaver et al. |
| 2013/0224632 A1 | 8/2013 | Roumi |
| 2013/0271085 A1 | 10/2013 | Chen et al. |
| 2014/0315096 A1 | 10/2014 | Borges et al. |
| 2015/0287545 A1 | 10/2015 | Ogawa et al. |
| 2016/0161437 A1 | 6/2016 | Peters et al. |
| 2017/0338060 A1 | 11/2017 | Vermeulen et al. |

FOREIGN PATENT DOCUMENTS

| | | |
|---|---|---|
| JP | 2009087814 A | 4/2009 |
| JP | 2013143422 A | 7/2013 |
| JP | 2013222622 A | 10/2013 |
| JP | 2013229130 A | 11/2013 |
| JP | 2015138648 A | 7/2015 |
| WO | 2007/021151 A1 | 2/2007 |
| WO | 2014120162 A1 | 8/2014 |

* cited by examiner

HIGH VOLTAGE SUPERCAPACITOR

CROSS-REFERENCE TO RELATED APPLICATIONS

This application is a continuation of U.S. patent application Ser. No. 15/454,063, filed Mar. 9, 2017, which claims priority to GB patent application no. 1612687.2, filed Jul. 21, 2016, and to GB patent application no. 1604133.7, filed Mar. 10, 2016, the disclosures of each of which are incorporated herein by reference.

BACKGROUND OF THE INVENTION

Field of the Invention

This invention relates to a supercapacitor employing an ionic liquid electrolyte which in particular is capable of operating at voltages greater than 3.5 v without significant degradation in its performance over multiple cycles of use.

Description of Related Art

In our co-pending applications PCT/GB2015/053003 and GB1518385.8 we have taught supercapacitors comprised of graphene—containing electrodes, a porous membrane and one or more ionic liquids; e.g. quaternary organic salts which are typically liquid at temperatures below 100° C. However, in many instances the performance of these supercapacitors is impaired because the viscosity of the ionic liquid is too high. This can lead to an undesirable increase in resistance and a diminution in the supercapacitor's charge-bearing capacity.

'Ionic Liquids—Current State of the Art'—Chapter 19 (ISBN 978-953-51-2122-0) published in 2015 provides a general review of the use of ionic liquids and graphene in supercapacitors.

CN104332325 teaches a method of making graphene for supercapacitors from graphite powder via the intermediate production of graphene oxide.

BRIEF SUMMARY OF THE INVENTION

We have now overcome the above problem by maintaining the viscosity and/or the temperature of the electrolyte in the supercapacitor in an optimum range. Thus according to a first aspect of the present invention there is provided a supercapacitor assembly characterised by comprising:
  a supercapacitor cell comprised of carbon-containing anode(s) and cathode(s), intermediate porous membrane(s) and an ionic liquid electrolyte;
  an electrical heater for heating the supercapacitor cell; and
  a thermostat for controlling the heater and maintaining the temperature of the ionic liquid at a temperature such that its viscosity is in the range 1 to 50 centipoise.

DETAILED DESCRIPTION OF THE INVENTION

In one preferred embodiment of the invention, the carbon-containing electrodes of the supercapacitor comprise anode and cathode surfaces consisting essentially of an electrically-conductive metal current collector in the form of a thin flexible sheet (for example aluminium, silver or copper foil) coated with a layer comprised of carbon charge-carrying elements. In another embodiment, at least some of these anode and cathode surfaces are disposed on opposite sides of the same sheet. Suitably, at least some of these charge-carrying elements are particles of carbon having an average longest dimension of less than 1 micron, preferably less than 100 nanometres in size. Preferably, these particles exhibit mesoporosity with the mesopores being in the size range 2 to 50 nanometres. In another embodiment, the carbon charge-carrying elements may be supplemented by nanoparticles of materials which can confer a degree of pseudocapacitance behaviour on the final supercapacitor; for example, salts, hydroxides and oxides of metals such as lithium or transition metals with more than one oxidation state including nickel, manganese, ruthenium, bismuth, tungsten or molybdenum.

In one preferred embodiment, the layer is comprised of carbon particles embedded in a conductive polymer binder matrix and is characterised by the weight ratio of the particles to the binder being in the range 0.2:1 to 20:1. In another embodiment, the carbon particles include graphene particles; in yet another they include carbon nanotubes. In one preferred embodiment a mixture of graphene and carbon nanotubes are employed optionally with activated carbon being present. In another suitable embodiment, the carbon particles comprise a mixture of these three components with the activated carbon, carbon nanotubes and graphene being present in the weight ratio 0.5-2000:0.5-100:1; preferably 0.5-1500:0.5-80:1.

By the term activated carbon is meant any amorphous carbon of high purity whose surface area is typically greater than 500 $m^2g^{-1}$ preferably from 1000 to 3600 $m^2g^{-1}$ and which has an average particle size of less than 1 micron. Such materials are readily available from a number of commercial sources. The carbon nanotubes used typically have an average length in the range 2-500 microns (preferably 100-300 microns) and an average diameter in the range 100-150 nanometres. The nanotubes may be single- or multi-walled or a mixture of both.

By the term graphene is meant the allotrope of carbon whose particles are substantially two-dimensional in structure. In extremis, these particles comprise single atomic-layer platelets having a graphitic structure although for the purposes of this invention this component may comprise a small number of such platelets stacked one on top of another e.g. 1 to 20 preferably 1 to 10 platelets. In one embodiment, these platelets are in a non-oxidised form. In another embodiment, the platelets independently have average dimensions in the range 1 to 4000 nanometres preferably 20 to 3000 or 10 to 2000 nanometres as measured by transmission electron microscopy. Any known method can be used to manufacture such materials, many of which are also available commercially; for example, under the name Elicarb® by Thomas Swan Limited in the United Kingdom.

In another embodiment, the carbon charge-carrying elements may further include up to 20%, preferably 1 to 20% by weight of a conducting carbon. Suitably, this conducting carbon comprises a highly conductive non-graphitic carbon having a polycrystalline structure and a surface area in the range 1 to 500 $m^2g^{-1}$. In one embodiment it is a carbon black; for example, one of those materials which have been used as conducting additive in in lithium-ion batteries (for example Timical SuperC65® and/or Timical SuperC45).

In one embodiment, the residual moisture in the electrodes after the method of the present invention has been carried out should be less than 100 ppm; preferably less than 50 ppm.

In yet another embodiment, the carbon-containing anode(s) and cathode(s) are asymmetric to one another; in other words, they have differing thicknesses—for example layers of differing thicknesses.

Turning to the conductive binder, this is suitably comprised of one or more electrically conductive polymers and is preferably selected from a cellulose derivative, a polymeric elastomer or mixtures thereof. In one embodiment the cellulose derivative is a carboxyalkyl cellulose for example carboxymethyl cellulose. In another embodiment the elastomer is a styrene-butadiene rubber or a material having equivalent properties.

Suitably the total charge-bearing surface area of the various components in the composite layer is >250 $m^2g^{-1}$ preferably >260 $m^2g^{-1}$.

Turning to the ionic liquid electrolyte, this suitably comprises an organic ionic salt which is molten below 100° C. and is preferably so at or below ambient temperatures. In another embodiment, it is a mixture comprised of one or more ionic liquids and the mixture has a viscosity at 25° C. in the range 10 to 80 centipoise; preferably 20 to 50 centipoise. In yet another embodiment, the electrolyte is a eutectic or near-eutectic mixture of at least two components one of which is an ionic liquid. Suitably these mixtures have a melting point below 100° C. preferably below 50° C.; and more preferably below 30° C. Eutectic behaviour is a well-known characteristic of those mixtures of two or more components whose melting point is significantly depressed over a given composition range relative to what might be expected on the basis of Raoult's law. Here, the term 'eutectic or near-eutectic mixture' is therefore to be construed as encompassing any mixture of components according to the invention whose melting point shows such a depression; with those having a depression greater than 50%, preferably greater than 90% of the depression at the actual eutectic point being most preferred. In an especially preferred embodiment the eutectic composition itself is employed as the electrolyte. In another embodiment at least one of the ionic liquids employed has an electrochemical window greater than 3 v.

In one embodiment, the electrolyte employed is a mixture, e.g. a eutectic or near-eutectic mixture, comprised of at least one of the ionic liquids described in U.S. Pat. No. 5,827,602 or WO2011/100232, to which the reader is directed for a complete listing. In another embodiment, the mixture consists of a mixture of at least two of the said ionic liquids.

Suitably, the ionic liquid employed or one of the ionic liquids employed in the electrolyte is thus a quaternary salt of an alkyl or substituted-alkyl pyridinium, pyridazinium, pyrimidinium, pyrazinium, imidazolium, piperidinium, pyrrolidinium, pyrazolium, thiazolium, oxazolium, triazolium or azepanium cation. In such a case, it is preferred that the counter-anion associated with each cation is large, polyatomic and has a Van der Waals volume in excess of 50 or 100 angstroms (see for example U.S. Pat. No. 5,827,602 which provides illustrative examples contemplated as being within the scope of our invention). It is also preferred that the anion is chosen so that it is asymmetric with respect to the cation ensuring that the ions in the liquid do not easily close pack and cause crystallisation. In one embodiment, the counter-anion is selected from the group consisting of tetrafluoroborate, hexafluorophosphate, dicyanamide, bis(fluorosulphonyl)imide (FSI), bis(trifluoromethylsulphonyl)imide (TFSI) or bis(perfluoro$C_2$to$C_4$alkylsulphonyl)imide, e.g. bis(perfluoroethylsulphonyl)imide anions or analogues thereof. In another preferred embodiment the ionic liquid(s) are selected from $C_1$ to $C_4$ alkyl substituted imidazolium, piperidinium or pyrrolidinium salts of these anions with any permutation of cations and anions being envisaged as being disclosed herein. From amongst this list the following binary systems are preferred: a piperidinium salt and an imidazolium salt; a piperidinium salt and a pyrrolidinium salt and an imidazolium salt and a pyrrolidinium salt. In alternative embodiments, the binary system may comprise either (a) a piperidinium salt and any substituted bulky quaternary ammonium salt of one of the above-mentioned anions; e.g. a trialkyl(alkoxylalkyl)ammonium salt thereof where the alkyl or alkoxy moieties independently have one, two, three or four carbon atoms or (b) one or more of the azepanium salts exemplified in WO2011/100232. In all of the cases referred to above, the salts employed should preferably each have an electrochemical window of greater than 3 volts and a melting point below 30° C.

Specific, non-limiting examples of electrolytes which can be employed include salts or mixtures of salts derived from the following cations; 1-ethyl-3-methylimidazolium (EMIM), 1-butyl-3-methylimidazolium (BMIM), 1-methyl-1-propylpyrrolidinium, 1-methyl-1-butylpyrrolidinium and the anions mentioned above. In one embodiment the electrolyte is one or more tetrafluoroborate salts of these cations. In another it is the same salt used in step (a) of the method.

In another embodiment the ionic liquid is a salt of a quaternary ammonium cation such as N,N-diethyl-N-methyl-N-(2-methoxyethyl)ammonium (DEME) and its homologues.

Suitably the water content of the ionic liquid is less than 100 ppm, preferably less than 50 ppm.

The intermediate porous membrane is suitably made from a polymer which is stable at the temperature at which the heater works.

In one embodiment, the electrical heater is suitably dispersed around the outer surfaces of the cell. It will preferably be provided with a thermostat to ensure that the desired temperature is maintained which will typically be in the range 30 to 100° C.; preferably 40 to 80° C. Preferably the temperature will be chosen so as to maintain the viscosity of the ionic liquid in the range 1 to 40 centipoise. For example, if the cell is a flat pouch then heaters may be disposed on either or both of the outer faces of the pouch. Alternatively, the heater may be a thin-film heater disposed within the pouch. In yet another embodiment the heater may comprise a heat-sink drawing heat from other electrical components in a device in which the supercapacitor is used in which case it may be possible to dispense with the thermostat and rely on thermal equilibration.

In one embodiment, the heater and supercapacitor may be surrounded by or embedded in insulation to protect the other components of any device in which it is used. In another embodiment the heater(s) and supercapacitor are clamped together in a way which prevents expansion of the internal volume of the supercapacitor when it is becomes hot. The internal surfaces of the pouch may be coated with a heat reflective layer in order to further manage the supercapacitor thermally.

The supercapacitor assembly of the present invention may be used to power or recharge a range of portable electrical devices including cordless electrically-powered tools (e.g. drills, screwdrivers, sanders and the like) and cordless domestic appliances (vacuum cleaners etc.). In another especially useful embodiment, it may be used to power or recharge personal electrical devices such as smartphones, radios, CD and DVD players, tablets, laptops or similar hand-held or worn items.

According to a second aspect of the present invention there is provided a method of operating a supercapacitor comprised of carbon-containing anode(s) and cathode(s), intermediate porous membrane(s) and an ionic liquid electrolyte characterised by the step of maintaining the ionic liquid at a temperature such that the viscosity of the ionic liquid is in the range 1 to 50 centipoise.

Preferably the method is operated at a temperature in the ranges given above to maintain the viscosity in the range 1 to 40 centipoise; e.g. 10 to 40 or 20 to 40 centipoise.

Embodiments of the supercapacitor of the present invention are especially useful where an operating voltage of greater than 3.5 v is required. Thus according to a third aspect of the invention there is provided a supercapacitor capable of operating at an operating voltage in the range 3.5 to 6 v without significant long-term redox degradation of its associated electrolyte characterised by comprising:

at least one anode and/or at least one cathode optionally including a graphene and/or carbon nanotube component;
an intermediate porous membrane located between the anode(s) and the cathode(s);
at least one ionic liquid composition having an electrochemical window of greater than 3.5 volts; and
a control means for maintaining the ionic liquid at a temperature in the range 40 to 80° C. and/or a viscosity in the range 1 to 50 centipoise whilst the supercapacitor is subjected to the operating voltage.

In one embodiment, the control means is a heating means and the supercapacitor further includes a thermostat for controlling the heating means in the above-mentioned temperature range and/or viscosity in the desired range or one of the preferred ranges mentioned above. Suitably the heating means is used to maintain the ionic liquid at a temperature in the range 40 to 80° C., preferably 50 to 60° C., in order to achieve the desired viscosity. In one embodiment the ionic liquid is a quaternary salt of the cation N,N-diethyl-N-methyl-N-(2-methoxyethyl)ammonium (DEME) or the like, e.g. DEME tetrafluoroborate or DEME TFSI or of the cation 1-butyl-3-methylimidazolium (BMIM) or one of its 1-alkyl and/or 3-alkyl homologues e.g. BMIM tetrafluoroborate or BMIM TFSI or a eutectic mixture of a pair of such salts. The electrochemical window of these salts may be determined for example as described in Journal of Industrial and Electrical Engineering Chemistry (January 2012) by Hayyan et al.

In another embodiment, the viscosity can be controlled by the addition of one or more additives to the electrolyte. These may include the addition of one or more solvents for the ionic liquid such as vinylidene carbonates e.g. propylene or butylene carbonate, organic esters and the like.

In another preferred example, the anode and cathode pairs are asymmetric. In yet another preferred example, the electrode includes graphene and/or a carbon nanotube component having a surface area in the range 2500-3500 $m^2g^{-1}$. Suitably at least one of the anode(s) and cathode(s) are doped with manganese oxide or a similar oxide.

Suitably the supercapacitor is one which can operate at a voltage in the range 4 to 6 v or in the range 4.5 to 5.5 v or in the range 4 to 5.5 v or in the range 4.5 to 5.5 v. In one embodiment, the supercapacitor is designed to operate in the range 4.5 to 6 v when maintained by the heating means at a temperature in the range 50 to 60° C.; preferably around 4.5 to 5.5 v. In another embodiment, the ionic liquid has an electrochemical window value of greater than 4 or 4.5 or 5 or even 5.5 v. In yet another embodiment the electrochemical window is in the range 4 to 6 v; preferably 4.5 to 6 v or 5 to 6 v. It should be appreciated that any combination of the operating voltage and electrochemical window ranges mentioned above are contemplated as being within the scope of the disclosure made herein.

The heating means can, for example, be an electrical heating element applied to the outside of the supercapacitor or an internal insulated heating element as explained above.

The supercapacitor of the third aspect of the invention may employed on a stand-alone basis; e.g. a recharging device for a lithium-ion battery or the like. Alternatively, it may comprise the sole or principal power source of a mobile electronic device (laptop, smartphone, tablet etc.) or a cordless power tool.

The present invention is now illustrated by the following Example.

Preparation of Coin Cells

An aqueous ink was prepared by mixing a powdered nano-carbon composition containing graphene with an aqueous binder comprised of carboxymethyl cellulose (CMC) and styrene-butadiene rubber (SBR) such that in the final mixture the weight ratio of the nano-carbons to CMC to SBR ratio was 90:5:5. A thin film of the ink was then applied to the surface of aluminium foil using a bar-coater to form electrode sheets. The sheets were then dried at 120-150° C. under vacuum, and stored inside a dry box. Thereafter 16 mm diameter electrode discs were cut from the sheets.

Composite coin cells were then fabricated from the discs in the dry box by layering the following items:
1—a bottom disc cap bearing a positive terminal
2—two spacers
3—a first electrode disc
4—75 µl of the ionic liquid
5—a membrane separator disc (19 mm diameter)
6—75 µl of the ionic liquid
7—a second electrode disc
8—a third spacer
9—a spring
10—a bottom disc cap bearing a negative terminal.

After assembly was complete, the coin cell was sealed by crimping prior to testing. For the test experiments reported below, multiple coin cells were produced using either BMIM tetrafluoroborate (electrochemical window: 4.5-5 v) or DEME tetrafluoroborate (electrochemical window: 6 v) as the electrolyte.

Coin Cell Testing

Figure 1:
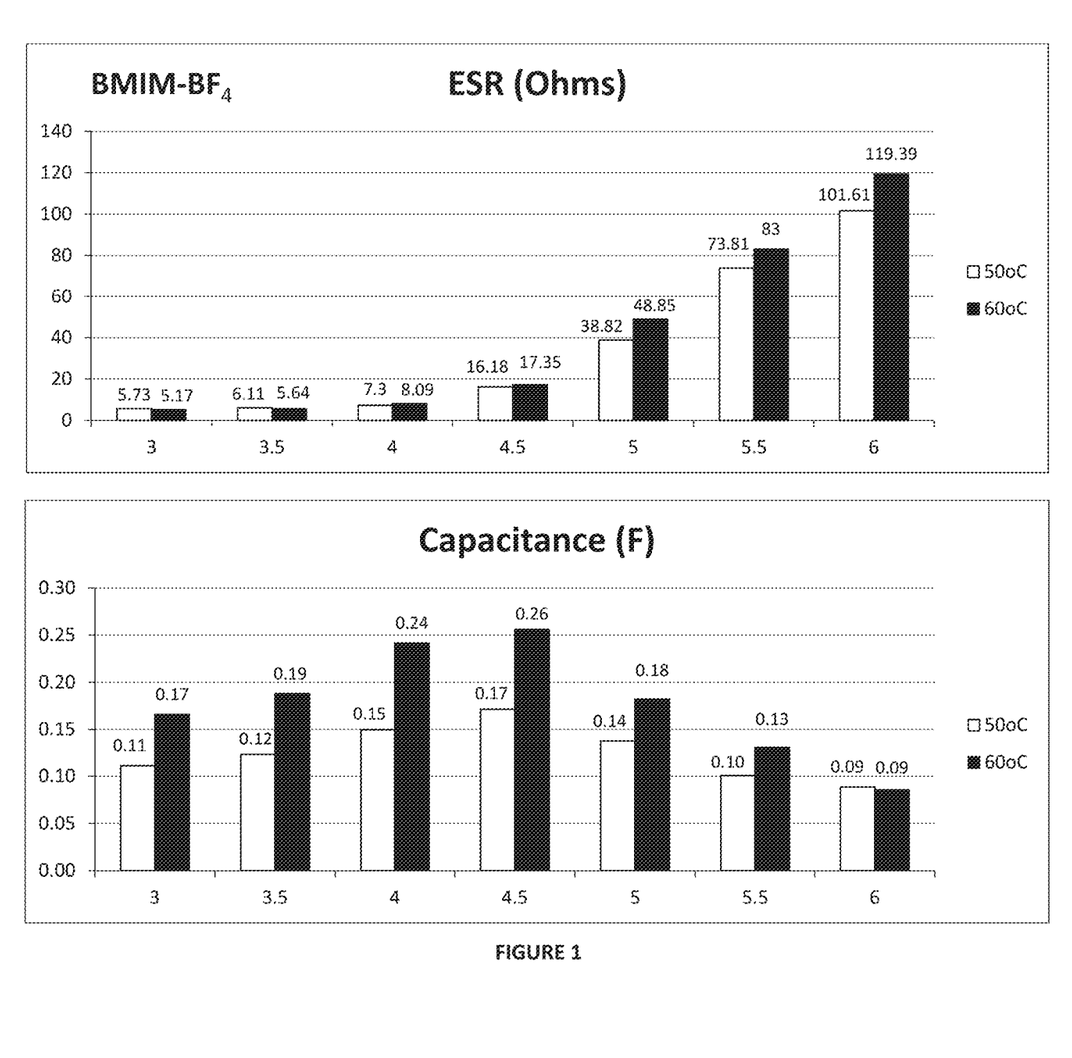
FIG. 1 and FIG. 2 are bar charts showing the results of coin cell testing of the present invention.
Figure 2:
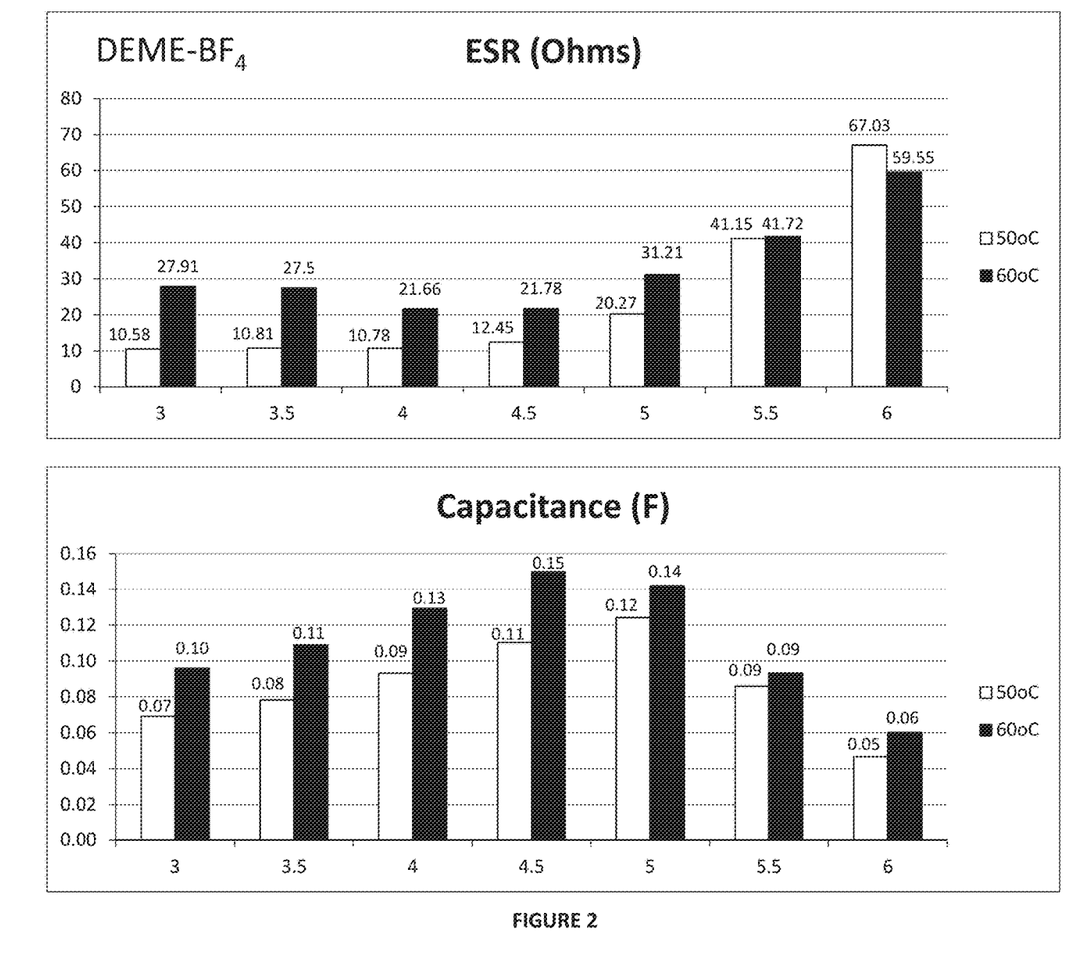

For each test a fresh coin cell was cycled ten times at the stated operating voltage and temperature using a standard charge/discharge cycle and a constant current of +10 mA for the charge and −10 mA for the discharge. The charge and discharge curves were plotted in each case and used to calculate the capacitance of the cell using the relationship $C=I/(dV/dT)$ where C is the capacitance, I the current and dV/dT the slope of the plot. At the same time, the Equivalent Series Resistance (ESR—in ohms) for the cell was calculated from the voltage drop between the charge and discharge curves and the current using the relationship $ESR=\Delta V/2I$ where $\Delta V$ is the voltage drop. The results, expressed in the bar charts in FIG. 1 and FIG. 2, show that increasing the temperature of the contents of the coin cell leads to improved capacitance as a consequence of the lowering of the viscosity of the ionic liquid. For these systems peak capacitance is found with an operating voltage in the range 4 to 5 v. ESR remains relatively low in this range but starts to increase at higher voltages.

Figure 3:
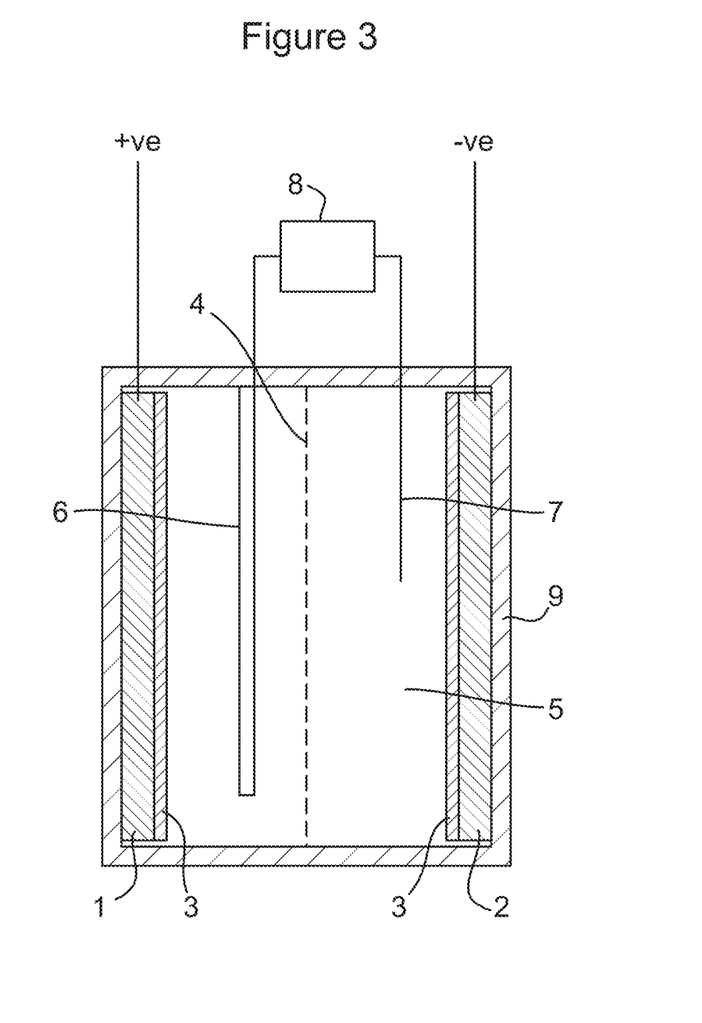
FIG. 3 is a cross-sectional view of a supercapacitor cell according to the present invention.

A supercapacitor cell according to the present invention is shown in cross-section in the FIG. 3. The cell comprises a current collector cathode 11 and a current collector anode 12 each of which is formed from a sheet of aluminium foil. To one face of each of current collector cathode 11 and current collector anode 12 is bonded a thin charge-storing matrix layer 13 comprised of a dispersion of activated carbon, a conducting carbon, nanoparticles of graphene and optionally carbon nanotubes in a carboxymethyl cellulose/styrene-divinylbenzene rubber binder. Current collector cathode 11 and current collector anode 12 are located within a container along with an intermediate porous polymer membrane 14. This configuration then defines void 15 into which an ionic liquid such as BMIM tetrafluoroborate is contained. Void 15 also contains heating element 16 which is controlled by external control box 18 in response to temperature measurements provided by temperature probe 17.

The invention claimed is:

1. An electrical device configured to be charged by a supercapacitor operating at an operating voltage in the range 4.5 to 5.5 v without significant long-term redox degradation of its associated electrolyte, wherein the electrical device comprises the supercapacitor, characterised in that the supercapacitor comprises:
   at least one anode and/or at least one cathode including a graphene and/or carbon nanotube component;
   an intermediate porous membrane located between the anode(s) and the cathode(s);
   at least one ionic liquid composition comprising at least one ionic liquid having an electrochemical window of greater than 4.5 volts, wherein the at least one ionic liquid comprises a quaternary ammonium cation or an alkyl or substituted-alkyl pyridinium, pyridazinium, pyrimidinium, pyrazinium, imidazolium, piperidinium, pyrrolidinium, pyrazolium, thiazolium, oxazolium, triazolium or azepanium cation; and
   a control means for maintaining the at least one ionic liquid at a temperature in the range 40° C. to 80° C. and a viscosity in the range 1 to 50 centipoise whilst the supercapacitor is subjected to the operating voltage, wherein the control means comprises an electrical heater for heating the supercapacitor and a thermostat for controlling the heater; wherein (i) the electrical heater is dispersed around the outer surfaces of the supercapacitor, ii) the supercapacitor comprises a pouch and the electrical heater comprises a thin film heater disposed within the pouch, optionally wherein the internal surfaces of the pouch are coated with a heat reflective layer, or (iii) the heater comprises a heat-sink configured to draw heat from other electrical components in a device in which the supercapacitor is used.

2. An electrical device as claimed in claim 1 wherein the at least one ionic liquid has an electrochemical window of greater than 5 v.

3. An electrical device as claimed in claim 2 wherein the at least one ionic liquid has an electrochemical window of greater than 5.5 v.

4. An electrical device according to claim 1, wherein the electrical device is a portable electrical device.

5. An electrical device according to claim 4, wherein the portable electrical device comprises a cordless electrically powered tool.

6. An electrical device according to claim 4, wherein the portable electrical device comprises a cordless domestic appliance.

7. An electrical device according to claim 4, wherein the portable electrical device comprises a personal electrical device.

8. An electrical device according to claim 7, wherein the personal electrical device comprises a smartphone, a radio, a CD player, a DVD player, a tablet, a laptop computer, or a warn item.

9. An electrical device according to claim 1, wherein the supercapacitor is a sole power source of the electrical device.

10. An electrical device according to claim 1, wherein the electrical device comprises a rechargeable battery, and wherein the supercapacitor is configured to charge the device in conjunction with the rechargeable battery.

11. An electrical device according to claim 10, wherein the supercapacitor is configured to charge the electrical device directly.

12. An electrical device according to claim 10, wherein the supercapacitor is configured to charge the rechargeable battery, and wherein the rechargeable battery is configured to charge the electrical device directly.

13. A system according to claim 1, wherein the electrical device comprises a rechargeable battery configured to charge the electrical device directly, and wherein the supercapacitor is configured to charge the rechargeable battery.

14. A system comprising an electrical device, and a supercapacitor operating at an operating voltage in the range 4.5 to 5.5 v without significant long-term redox degradation of its associated electrolyte, wherein the supercapacitor is a separate ancillary component to the electrical device; characterised in that the supercapacitor comprises:
   at least one anode and at least one cathode including a graphene and/or carbon nanotube component;
   an intermediate porous membrane located between the anode(s) and the cathode(s);
   at least one ionic liquid composition comprising at least one ionic liquid having an electrochemical window of greater than 4.5 volts, wherein the at least one ionic liquid comprises a quaternary ammonium cation or an alkyl or substituted-alkyl pyridinium, pyridazinium, pyrimidinium, pyrazinium, imidazolium, piperidinium, pyrrolidinium, pyrazolium, thiazolium, oxazolium, triazolium or azepanium cation; and
   a control means for maintaining the at least one ionic liquid at a temperature in the range 40° C. to 80° C. and a viscosity in the range 1 to 50 centipoise whilst the supercapacitor is subjected to the operating voltage, wherein the control means comprises an electrical heater for heating the supercapacitor and a thermostat for controlling the heater; wherein (i) the electrical heater is dispersed around the outer surfaces of the supercapacitor, ii) the supercapacitor comprises a pouch and the electrical heater comprises a thin film heater disposed within the pouch, optionally wherein the internal surfaces of the pouch are coated with a heat reflective layer, or (iii) the heater comprises a heat-sink configured to draw heat from other electrical components in a device in which the supercapacitor is used.

15. A power tool comprising a supercapacitor operating at an operating voltage in the range 4.5 to 5.5 v without significant long-term redox degradation of its associated electrolyte, characterised in that the supercapacitor comprises:
   at least one anode and at least one cathode including a graphene and/or carbon nanotube component;

an intermediate porous membrane located between the anode(s) and the cathode(s);

at least one ionic liquid composition comprising at least one ionic liquid having an electrochemical window of greater than 4.5 volts, wherein the at least one ionic liquid comprises a quaternary ammonium cation or an alkyl or substituted-alkyl pyridinium, pyridazinium, pyrimidinium, pyrazinium, imidazolium, piperidinium, pyrrolidinium, pyrazolium, thiazolium, oxazolium, triazolium or azepanium cation; and a control means for maintaining the at least one ionic liquid at a temperature in the range 40° C. to 80° C. and a viscosity in the range 1 to 50 centipoise whilst the supercapacitor is subjected to the operating voltage, wherein the control means comprises an electrical heater for heating the supercapacitor and a thermostat for controlling the heater; wherein (i) the electrical heater is dispersed around the outer surfaces of the supercapacitor, ii) the supercapacitor comprises a pouch and the electrical heater comprises a thin film heater disposed within the pouch, optionally wherein the internal surfaces of the pouch are coated with a heat reflective layer, or (iii) the heater comprises a heat-sink configured to draw heat from other electrical components in a device in which the supercapacitor is used.

16. A laptop, smart phone or tablet comprising a supercapacitor operating at an operating voltage in the range 4.5 to 5.5 v without significant long-term redox degradation of its associated electrolyte, characterised in that the supercapacitor comprises:

at least one anode and at least one cathode including a graphene and/or carbon nanotube component;

an intermediate porous membrane located between the anode(s) and the cathode(s);

at least one ionic liquid composition comprising at least one ionic liquid having an electrochemical window of greater than 4.5 volts, wherein the at least one ionic liquid comprises a quaternary ammonium cation or an alkyl or substituted-alkyl pyridinium, pyridazinium, pyrimidinium, pyrazinium, imidazolium, piperidinium, pyrrolidinium, pyrazolium, thiazolium, oxazolium, triazolium or azepanium cation; and a control means for maintaining the at least one ionic liquid at a temperature in the range 40° C. to 80° C. and a viscosity in the range 1 to 50 centipoise whilst the supercapacitor is subjected to the operating voltage, wherein the control means comprises an electrical heater for heating the supercapacitor and a thermostat for controlling the heater; wherein (i) the electrical heater is dispersed around the outer surfaces of the supercapacitor, ii) the supercapacitor comprises a pouch and the electrical heater comprises a thin film heater disposed within the pouch, optionally wherein the internal surfaces of the pouch are coated with a heat reflective layer, or (iii) the heater comprises a heat-sink configured to draw heat from other electrical components in a device in which the supercapacitor is used.

\* \* \* \* \*

UNITED STATES PATENT AND TRADEMARK OFFICE
CERTIFICATE OF CORRECTION

PATENT NO. : 11,170,946 B2
APPLICATION NO. : 16/407178
DATED : November 9, 2021
INVENTOR(S) : Voller et al.

It is certified that error appears in the above-identified patent and that said Letters Patent is hereby corrected as shown below:

On the Title Page

Item (63) should read:
--(63) Continuation of application No. 15/454,063, filed on Mar. 9, 2017, now Pat. No. 11,164,703.--

Signed and Sealed this
Twelfth Day of July, 2022

Katherine Kelly Vidal
*Director of the United States Patent and Trademark Office*